(12) United States Patent
Haas et al.

(10) Patent No.: US 6,222,552 B1
(45) Date of Patent: Apr. 24, 2001

(54) SYSTEMS AND METHODS FOR CACHING DEPTH INFORMATION OF THREE-DIMENSIONAL IMAGES

(75) Inventors: Jürgen Haas, Kusterdingen (DE); Chandra Narayanaswami, Wilton, CT (US); Bengt-Olaf Schneider, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/895,460

(22) Filed: Jul. 16, 1997

(30) Foreign Application Priority Data

Jul. 26, 1996 (EP) .................................... 96112095

(51) Int. Cl.⁷ ............................. G06T 15/40; G06T 1/00
(52) U.S. Cl. ............................................. 345/422; 345/501
(58) Field of Search ................................. 345/422, 425, 345/508, 511, 512, 514

(56) References Cited

U.S. PATENT DOCUMENTS

| | | | |
|---|---|---|---|
| 4,475,104 | 10/1984 | Shen | 340/729 |
| 4,899,275 | * 2/1990 | Sachs et al. | 711/3 |
| 4,970,499 | * 11/1990 | Ryherd et al. | 345/422 |
| 5,268,995 | 12/1993 | Diefendorff et al. | 395/122 |
| 5,276,851 | 1/1994 | Thacker et al. | 395/425 |
| 5,493,644 | * 2/1996 | Thayer et al. | 345/502 |
| 5,673,422 | * 9/1997 | Kawai et al. | 345/519 |
| 5,752,260 | * 5/1998 | Liu | 711/129 |
| 5,760,780 | * 6/1998 | Larson et al. | 345/422 |

FOREIGN PATENT DOCUMENTS

| | | | |
|---|---|---|---|
| 0 435 475 A3 | 7/1991 | (EP) | G06F/12/08 |
| 0500035A2 | 2/1992 | (EP) | G06F/16/72 |
| 62-042279 | 2/1987 | (JP) | G06F/15/72 |
| WO95/16960 | 6/1995 | (WO) | G06F/12/08 |
| WO95/24682 | 9/1995 | (WO) | G06F/12/00 |

OTHER PUBLICATIONS

Catmull, Edwin, *A Subdivision Algorithm for Computer Display of Curved Surfaces*, Dissertation, University of Utah (Dec. 1974).

Newell, M.E., et al., *A Solution to the Hidden Surface Problem*, Proceedings of the ACM Annual Conference, pp. 443–450 (Boston, Aug. 1972).

Knittel, Günter, et al., *Eliminating the Z–Buffer Bottleneck*, University of Tübingen, Germany (pp. 1–6).

Newman, William M., *The Depth–Buffer Algorithm*, Principles of Interactive Computer Graphics, 2d, pp. 369–371 (McGraw–Hill 1979).

European Search Report for European Application No. 97111727.0.

* cited by examiner

Primary Examiner—William A. Cuchlinski, Jr.
Assistant Examiner—Thu Nguyen
(74) Attorney, Agent, or Firm—Myers Bigel Sibley & Sajovec, P.A.; Edward H. Duffield

(57) ABSTRACT

A Z-cache is provided for use in rasterizing computer generated images. The Z-cache allows for caching depth information such that a depth buffer may be implemented in system memory without degradation in performance of a depth routine for determining the visible information in a display. The Z-cache may store and compare pixel depth information. Thus, methods of using a z-cache in a graphics system as well as a graphics system, a processing system and a rasterizer are provided which utilize a Z-cache.

12 Claims, 13 Drawing Sheets object ⟶ surface ⟶ polygones ⟶ primitives

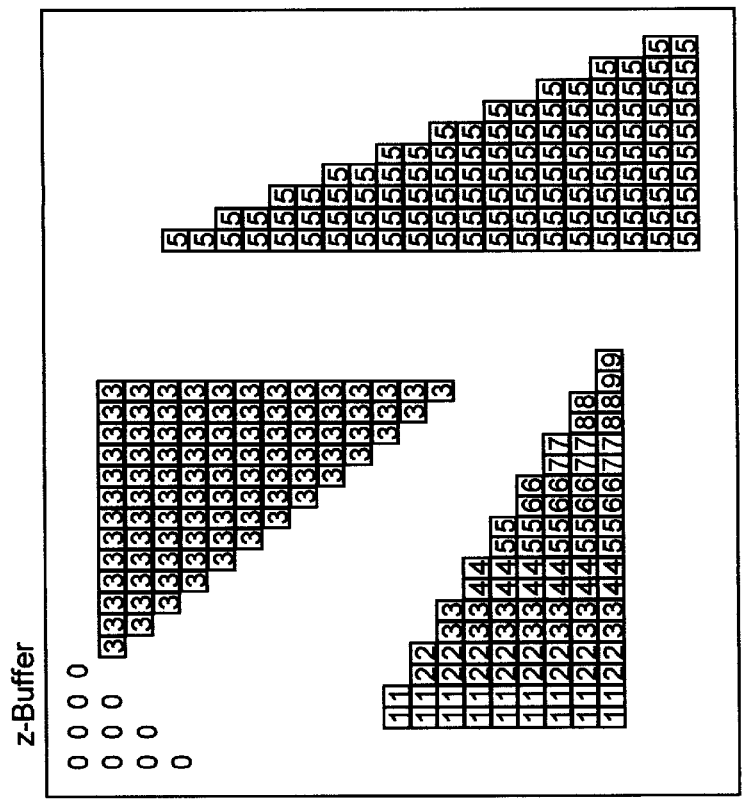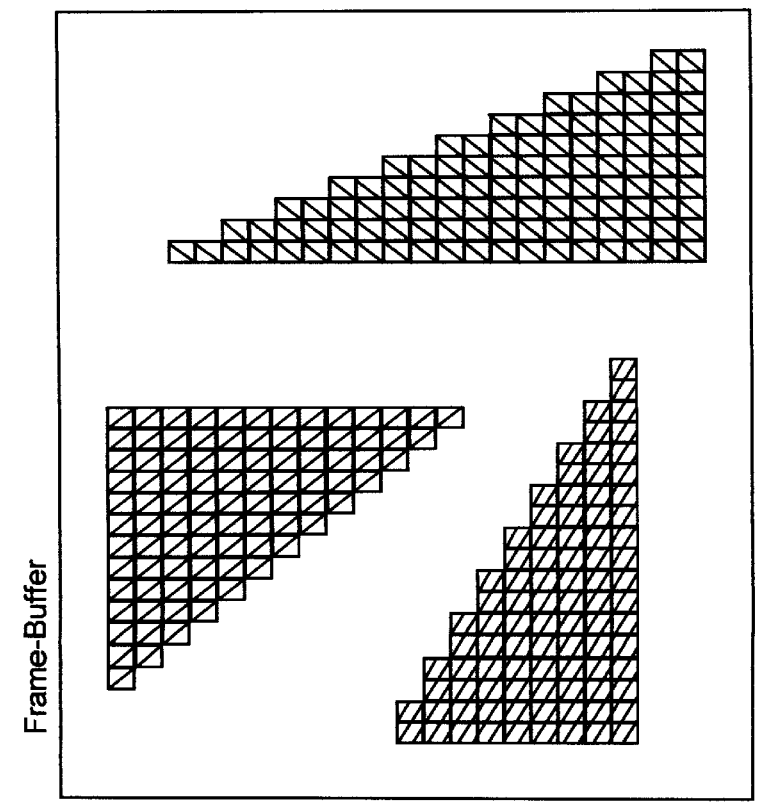
FIG. 5A

FIG. 5B
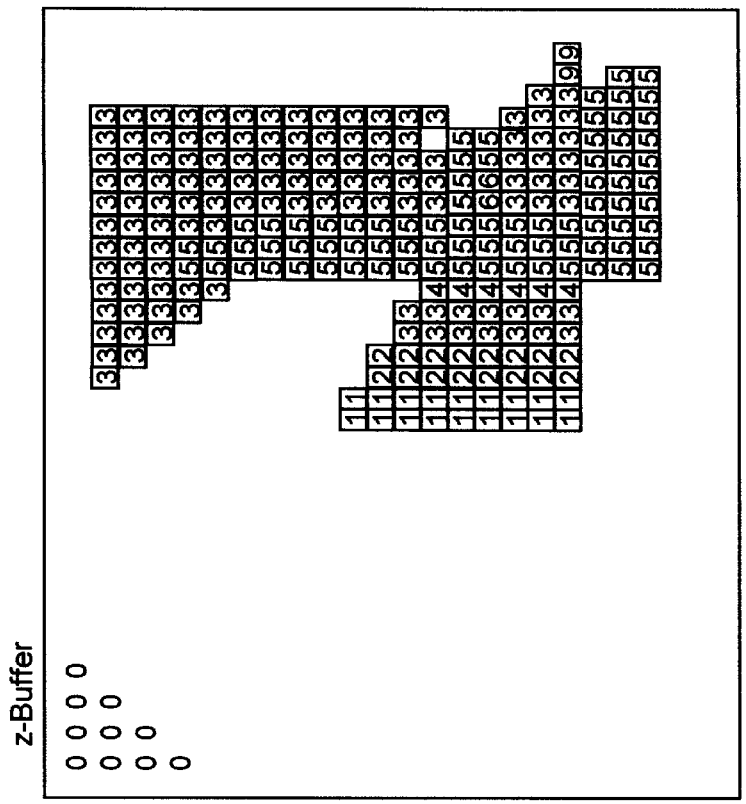
z-Buffer
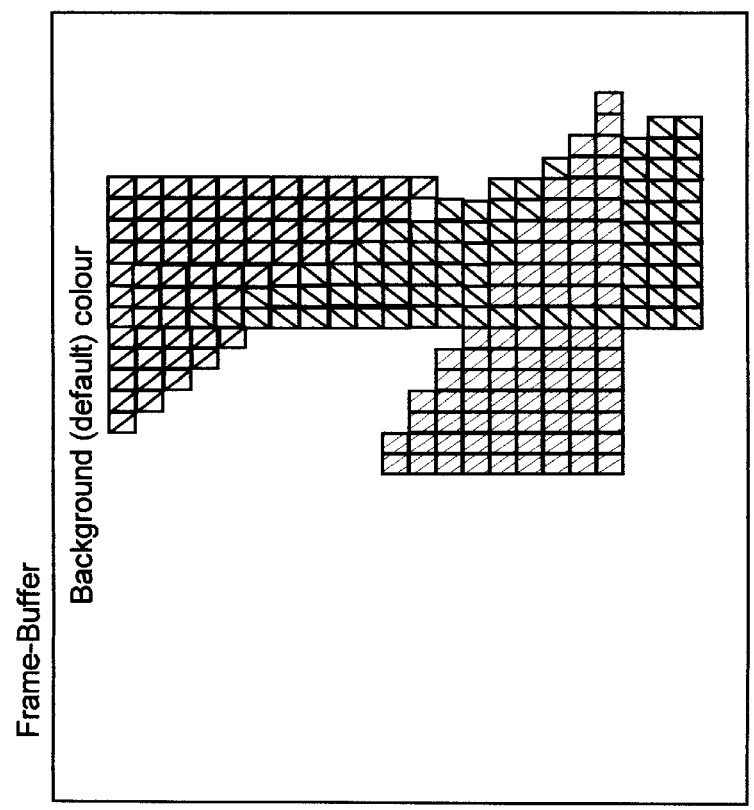
Frame-Buffer
Background (default) colour FIG. 10 cache hit: (z-new>=z-old), do not replace z-old cache -miss: tag mismatch, DIRTY bit reset

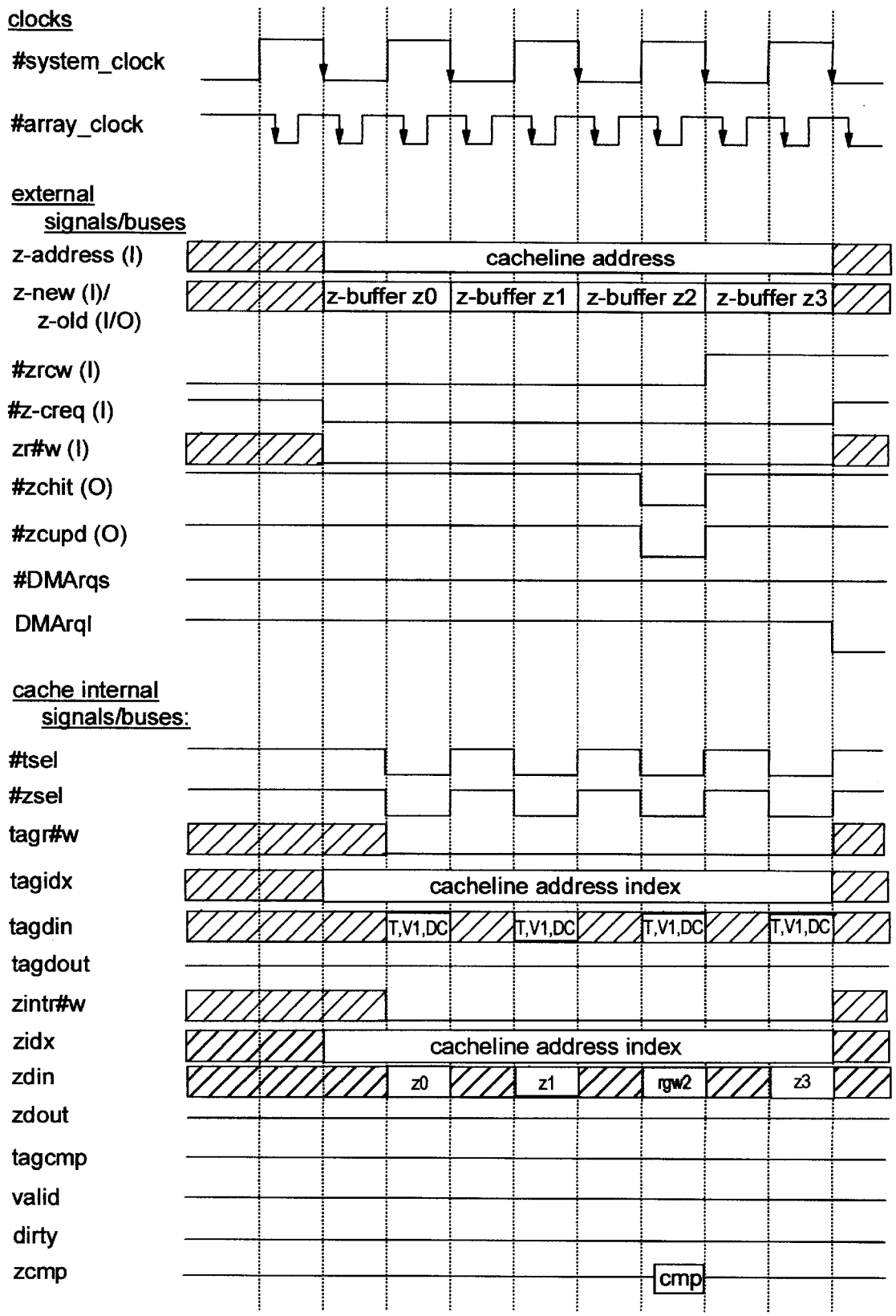
FIG. 14 burst cache line read with concurrent cache hit and update

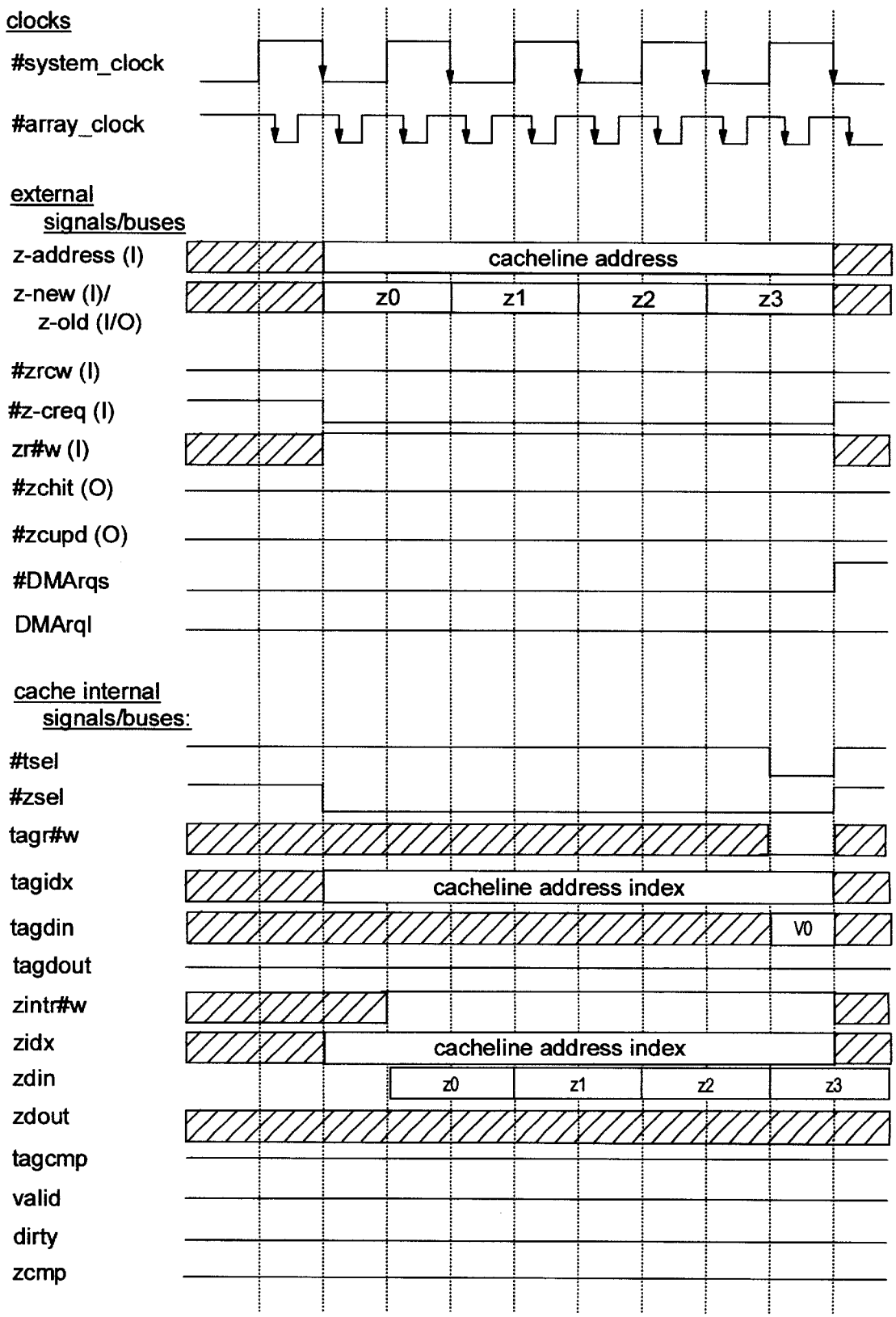
FIG. 15 burst cache line store (write back to z-buffer)

SYSTEMS AND METHODS FOR CACHING DEPTH INFORMATION OF THREE-DIMENSIONAL IMAGES

FIELD OF THE INVENTION

The invention relates generally to computer systems, and more particularly to the display of images via computer systems.

BACKGROUND OF THE INVENTION

Three-dimensional (3D) objects are commonly represented in computer graphics applications as an approximation of their surface via a sufficiently large number of polygons, such as triangles. Graphical output devices for displaying computer graphics are typically raster devices having a display area or screen comprised of a set of discrete picture elements referred to as pixels as illustrated in FIG. 1. Each pixel on the screen is associated with one entry in a display buffer (also referred to as a "frame buffer") which stores a value for the color of each pixel. The frame buffer is then loaded with image information and that information is displayed by the pixels of the display.

The approximation of a cylindrical surface using multiple triangles may be used to illustrate the use of polygons to approximate an object. The steps for approximating the surface of a cylindric object via multiple triangles (also referred to as "primitives") are illustrated in FIG. 2. For display purposes, each triangle is typically decomposed into a set of screen pixels, a process called "rasterization". Rasterization is usually implemented via a specific rasterizer chip.

Referring now to FIG. 3, a conventional layout of graphics system hardware is schematically illustrated. As seen in FIG. 3, an application program 1 may display a 3D graphic object (image) on a conventional two-dimensional (2D) display 2. Typically, the 3D data is stored in a database 3. A processing unit (CPU) 4 may control the 3D data input to the database 3 and a geometric graphics unit 5 which is responsible for geometric object transformations like scaling, moving or rotating the objects. The CPU 4 may also control a rasterizer 7 for decomposing each primitive into pixels. A pixel driver 8, which is also connected to the CPU 4, controls the display 2 for 2D presentation of 3D graphics.

In converting from a 3D representation of an image to a 2D representation, the visible parts of an object can be determined by computing for each pixel a measure of the distance to the observer, called Depth Value or "Z-Value", and by comparing that Z-Value to the Z-Value of the pixel previously generated for a particular screen address. Routines for handling visible surface determination within 3D graphics display systems are known. The most common of these routines relate to pre-sorting of objects/polygons according to depth before rasterization, or relate to depth buffering.

A depth sort routine, developed by Newell and Sancha (Newel, M. E., R. G. Newell, and T. L Sancha, "A solution to the Hidden Surface Problem", in Proceedings of the ACM National Conference 1972, 433–450), paints polygons into a frame buffer in order of decreasing distance from the viewpoint. Three conceptual steps are performed: 1) sorting all polygons according to the smallest (farthest) Z coordinate of each; 2) resolving any ambiguities resulting when Z coordinates of polygons overlap, and splitting polygons if necessary; and 3) scan-converting each polygon in ascending order of smallest Z coordinate, (i.e. from back to front).

For CPU performance reasons, pre-sorting of polygons is used typically for smaller scenes having a relatively small number of objects. Other routines may be used for applications dealing with more complex 3D) scenes. As used herein, the term "scene" is synonymous with the terms "graphics" and "images".

The depth-buffer routine, developed by E. Catmull, and disclosed in an article entitled "A Subdivision Algorithm for Computer Display of Curved Surfaces" (published in Ph.D. Thesis, Computer Science Department, University of Utah, December 1974), is commonly implemented in 3D display system. This routine requires a frame buffer in which color values are stored, and a Z-Buffer, with the same number of entries, in which a Z-Value (depth value) is stored for each pixel of a scene, as illustrated in FIG. 5A. The Z-Buffer is initialized to zero, representing the Z-Value at the back clipping plane. The frame buffer is initialized to the background color. The largest value that can be stored in the Z-Buffer represents the Z-Value (or depth) of the front clipping plane. The advantage of this routine is that polygons which belong to any object can be rendered in arbitrary order independent of their depth. However, depth buffer routines may require large amounts of memory, which is less of a significant disadvantage as semiconductor memory increases in density which decreases cost.

In a depth-buffer routine, during the scan conversion process, if the polygon point being scan-converted at (X, Y) is no farther from the viewer than is the point whose color and depth are currently in the frame buffer and the Z-Buffer, respectively, then the color and depth of the new points replace the old values, as illustrated in FIG. 5B. Prior art implementations of depth buffer routines typically have a dedicated Z-Buffer integrated in dynamic random access memory (DRAM). The rasterizer typically requires at least one access to the Z-Buffer and one comparison of the old and new depth values. Around 50% of the pixels typically require write access to the external Z-Buffer. The operations and accesses typically are done at pixel frequency. Limiting factors for a Z-Buffer routine include: the access time to the dedicated DRAM Z-Buffer; overall bandwidth requirements during Z-Buffer access; and cost of on-board space for the dedicated Z-Buffer memory.

In U.S. Pat. No. 4,475,104 a method of generating a two-dimensional image representing a three-dimensional image or scene in the form of an array of pixels utilizes "depth buffer" or "Z-Buffer" hidden surface removal (HSR) is provided. The hidden surface removal occurs at the time of scan conversion and attempts to ensure that the image of an object in the scene, which has already been converted, is not overwritten by input pixel data which arrives later, but in fact, corresponds to an object behind the one already stored. In the depth-buffer routine, the stored foreground color is overwritten if the input depth is less than the stored foreground depth. The input depth is then stored as a new foreground depth.

The depth-buffer routine is described more generally in "Principles of Interactive Computer Graphics", page 369, by W. M. Newman and R. F. Sproull. As described by Newman and Sproull, the routine does not require knowledge of any object other than that being scan-converted at the time.

Referring now to FIG. 4, a conventional three-dimensional graphic display apparatus is schematically illustrated. A line generator generates X-, Y-, and Z-coordinate data in a three-dimensional coordinate system. The output of the line generator is fed into a depth-buffer memory 10 which stores coordinate data representing the depth of each pixel in order to execute a hidden-surface process of a graphic image on the basis of the X-, Y-, and Z-data supplied from the line generator. X- and Y-coordinate data from the line generator and the Z-coordinate data from the depth-buffer memory 10 are input into a frame buffer memory 11. The frame buffer memory 11 stores display information used to display an image on the basis of the data feed from the line generator and the depth-buffer memory 10. The output of the frame buffer memory 11 is delivered to a cathode ray tube (CRT) 12 which displays the three-dimensional scene.

Since the depth-buffer routine needs a depth-buffer memory with a large capacity of storage, a DRAM is usually used because of its relatively low cost. Unfortunately, DRAMs typically have a slow access speed. In a hidden-surface process, a depth-buffer memory operates to read out depth information (Z-coordinate data), to compare this information, and to update this depth information. Consequently, the depth-buffer memory is required to execute a READ-WRITE cycle, which often results in slow operating speeds as compared with the line generator and the frame buffer memory operating in synchronism with the depth-buffer memory. As a result, it is often difficult to achieve higher hidden-surface processing speeds in a conventional three-dimensional graphics display system.

One approach to addressing memory bandwidth problems caused by the Z-Buffer bottleneck is disclosed in an article by G. Knittel and A. Schilling, University of Tübingen, Germany, (related to the MONOGRAPH project, and supported by the European CEC's ESPRIT programme). Presented therein is a memory design which integrates the required compare logic into the Z-Buffer memory devices, and performs the complete Z-Buffer routine on a chip. This method is advantageous because internal bandwidth becomes available, and the read-modify-write cycles are turned into merely write cycles from an external point of view.

Another approach to the bandwidth problem is disclosed in European Patent Application 0,500,035, where a 3D graphics display system is provided with a modified depth-buffer routine. In the modified depth-buffer routine READ-WRITE cycles are performed in a depth buffer memory only when patterns are actually overlapped and when Z coordinate data has to be compared with each other. Because it is not necessary to compare z coordinate data, only WRITE cycles are performed in the depth-buffer memory if the patterns are not overlapped. As a result, the hidden-surface process executed in a three-dimensional graphic display system has increased speed.

Another method of hidden-surface processing is disclosed in Japanese Patent Public Disclosure No. 42279/1987 (published on Feb. 24, 1987) and claims increased efficiency in the depth information comparison. As described in the Disclosure No. 42279/1987, with respect to the depth information comparison process, a Z-Value is updated on the basis of an "AND" condition. Such a process may be complicated and may not be suited for a hidden-surface process in a depth-buffer routine.

As is clear from the discussion above, the rendering of three-dimensional graphic images on a two-dimensional raster scan display screen often involves the use of a frame buffer to store the final image. The information in the frame buffer is often the end product of numerous data manipulations involving the generation of three-dimensional objects by a processor. Depth comparisons referenced to a Z-Buffer may be used to render into the frame buffer only the objects or portions thereof which are visible. The frame buffer memory is a special purpose type of memory in which the memory locations correspond to locations, or pixels, on a monitor, or other type of display. Known graphics systems may not provide for efficient use of a main memory, because information is transferred between the main memory and the frame buffer memory via a system bus under control of a CPU. Therefore, known computer graphics systems have a CPU cache memory which contains the information in memory locations most frequently accessed by the CPU.

A typical cache memory system consists of cache random access memory (RAM), a cache controller, is and a tag store. The tag store is a table of the main memory addresses of the information that is stored in the cache RAM. The cache RAM stores the information that is operated on by the CPU. The cache controller controls the information that passes in and out of the cache RAM, and updates the cache tag store. The specific structure of the cache tag store and its entries are dependent on whether a cache is a direct mapped cache, a set associative cache, or a fully associative cache. One characteristic of all cache tag stores, however, is that they need a method for indicating the main memory addresses corresponding to the entries in the cache memory. When the CPU needs the information in a main memory address, the tag store is searched for the main memory address. If the main memory address is in the tag store (a cache "hit"), the information is retrieved from the cache RAM and sent to the CPU. If the main memory address is not in the tag store (a cache "miss"), the cache controller retrieves the information from the main memory, stores it in the cache RAM, and records the main memory address in the tag store. When the CPU stores the information, it sends the information back to the cache controller which stores the information in the cache RAM. If the cache is a "write through" cache, the information is also written to the corresponding address in the main memory. If the cache is a "write back" cache, the information is not written to the corresponding address in the main memory until a later time.

Several attempts have been made to utilize a cache in graphics processing. One such approach is seen in International Patent Application WO95/24682 which describes a semiconductor chip in a computer graphics display system for performing texture mapping. A cache memory is used to accelerate the reading and writing of texture elements ("texels"). In texture mapping, a pattern image or texture map is combined with an area or surface of an object to produce a modified object with the added detail of the texture map. As the surface of an object is rendered, the respective two-dimensional index data necessary for associating two-dimensional information into an array of texture pixels are interpolated and used to look-up a texture value for each rendered pixel. The computer graphics systems described in Application WO95/24682 require a fast, accurate and efficient texture mapping process. The texture maps are stored in a main memory. The data for recent texture maps are cached in order to accelerate the reading and writing of texels. When a DRAM row is accessed, its contents can be transferred to the cache while simultaneously accessing the cache and cycling the DRAM array again. The memory access cycles can be performed in parallel due to reading from the cache. Further, a graphics subsystem is provided for processing object data into a screen coordinate system. The subsystem generates pixel data based on primitives (e.g., points, lines, polygons, and meshes) from the subsystem. The pixel data is sent to another subsystem, whereupon Z-Buffering, blending, texturing, and anti-aliasing functions are performed. The resulting pixel values are stored in a frame buffer. The cache memory coupled to the main memory is used for storing recently used texture data.

Another method and system for caching graphic S information for display in a graphics processing system is described in International Patent Application WO95/16960. The described system and method may avoid repeated rendering each time a graphic is required to be redrawn. The method and system described therein are directed to specifying which graphic objects should be cached and requesting that caching be carried out for those graphics. The proposed caching system is performed explicitly at the request of a developer. A cached graphic image may be stored in a device-dependent manner so that the cached image can be transferred directly to the respective device with little or no interpretation such as scaling, bit-depth translation, color look-up, and the like.

The various approaches described above, in particular the cache approaches, are typically insufficient for use with the a Z-Buffer routine, which is usually implemented in 3D hardware accelerators for visible surface determination. Consequently, disadvantages in performance and cost with respect to visible surface determination typically exist in graphics display systems.

SUMMARY OF THE INVENTION

In light of the above discussion, it is an object of the present invention to facilitate the use of the Z-Buffer routine when caching graphics for display via a graphics display system.

It is another object of the present invention to facilitate a use of the Z-buffer routine in order to enhance display performance without increasing costs. According to one embodiment of the present invention, the Z-Buffer routine is improved by a method of caching depth information implemented via a specific depth cache memory (a "Z-Cache"). The use of a Z-Cache increases the performance of Z-Buffering significantly while reducing overall graphics subsystem cost by removing the dedicated Z-Buffer from the graphics board and using the system memory (e.g. of a 3D rasterizer chip) to store Z-Values (depth information per pixel).

The invention facilitates the efficient use of an on-chip depth cache which incorporates a known Z-Buffer routine. Z-Buffer access speed may be increased by burst read and write of depth values from the Z-Buffer in system memory to the Z-Cache and vice versa. Thus, rapid access to Z-values already stored in the Z-Cache can be achieved. Furthermore, the overall execution time of the Z-Buffer routine may be significantly improved with respect to the implementation of a one cycle read/compare/write operation to Z-values in case of a cache "hit". Overall 3D graphics subsystem cost may also be reduced because the dedicated Z-Buffer is replaced by a pseudo Z-Buffer which is mapped into the system memory. If a 3D graphics application is not running on the data processing system, the system memory utilized by the pseudo Z-Buffer resource can be shared by other applications.

The present invention can be applied to visible surface determination, texture mapping, color blending, fogging, or glassy effects. Furthermore, the present invention is not restricted to display devices with line scan oriented image generation, but is also applicable to other display devices, such as those with circular line oriented geometry.

The present invention is particularly useful in texture mapping where small textures which are replicated during the mapping process. In such a case, the storing of these small textures in an on-chip cache may speed up the mapping process.

In the case of color blending (for example, fogging, transparency or anti-aliasing), specific pixels have to be reloaded many times until the final color is determined. Storing intermediate results of the pixels to be blended in the on-chip cache speeds up the blending process.

Thus, in one embodiment of the present invention, a method of visible surface determination in a graphics display system for mapping 3D-graphics information onto a 2D-presentation space, where depth information is provided via a depth buffer routine is provided. The method includes storing a first value of depth information for a pixel in a depth cache memory and comparing a second value of depth information for the pixel provided via said depth buffer routine with the first value of depth information stored in the depth cache memory to provide a depth comparison result. The first value of depth information stored in the depth cache memory information is then selectively replaced with the second value of depth information based upon the depth comparison result. In a further embodiment, the comparison may be a one cycle read/compare/write operation. The first value of depth information may be obtained from a z-buffer resident in system memory of a processing system. Furthermore, the second depth value may be stored in the z-buffer resident in system memory if the first value of depth information is replaced with the second value of depth information.

In another embodiment of the present invention, first depth values associated with pixels in a display are stored in a depth buffer in system memory. A first depth value from the depth buffer associated with a specific pixel is stored in a depth cache. A second depth value is determined for the specific pixel and the second depth value of the specific pixel is compared with the first depth value associated with the specific pixel stored in the depth cache to provide a depth-comparison result. The first depth value stored in the depth cache is then selectively replaced with the second depth value based upon the depth comparison result.

In another embodiment of the present invention, a graphics processing system is provided. The graphic processing system includes a central processing system and a rasterizer which rasterizes three-dimensional image data received from the central processing system. System memory is operably associated with the central processing system and the rasterizer and a portion of the system memory provides a z-buffer. The rasterizer includes a depth unit for determining depth information associated with a pixel and a z-cache which selectively stores depth information received from the z-buffer in the system memory and depth information received from the depth unit.

In a further embodiment the z-cache includes cache memory for storing-depth values and a tag array which provides for location of depth values stored in the cache memory. A comparator compares depth values stored in the cache memory with depth values received from the depth unit and a z-cache control unit controls accesses to the system memory and the cache memory.

The graphics system may also include a frame buffer for storing pixel data to be displayed by a display device. The rasterizer of the graphics system may include a texture unit for texturing images rasterized by the rasterizer and a frame buffer control unit which controls access to the frame buffer by the rasterizer.

In an alternative embodiment of the present invention a data processing system for visible surface determination of 3D-graphics having n-bit depth information for each graphical element, wherein the visible surface determination is performed via a depth buffer routine is provided. The data processing system includes means for storing attribute information for each of the graphical elements and means for storing depth information for each of the graphical elements. Depth cache means is also provided for storing recently used depth information and for performing the depth buffer routine. In a particular embodiment of the present invention, the depth cache means comprises a write-only cache memory that signals if a write operation is successful and if previously stored depth information remains in the depth cache means. The depth cache means may also be a burst read and write cache memory. The depth cache means may also be mapped into system memory.

In still another embodiment of the present invention, the depth cache means includes control means for controlling the depth buffer routine and for controlling loading and storing of depth information in the depth cache means. The depth cache means also includes array means for storing actual graphical element information. The array means may include tag array means for storing address bits of the depth information storing means, first indicator means for indicating validation of depth values in a respective depth cache memory line and second indicator means for indicating whether a depth cache memory line is incoherent with a respective line stored in the depth information storing means.

In one embodiment of the present invention, a cache for implementing a depth-buffer routine for visible surface determination in a 3D-graphics data processing system is provided. The cache includes a controller for controlling the depth buffer routine and for controlling access to the cache and an array unit for storing depth values within the cache. The array unit may also include a tag array for storing a significant bit of a z-buffer address, a validation bit of cache line, and a dirty bit for indicating cache line incoherency. Furthermore, the cache may include means for comparing applied depth values with existing depth values and means for replacing existing depth values with the applied depth values.

In another embodiment of the present invention a rasterizer which rasterizes three-dimensional image data is provided. The rasterizer includes a depth unit for determining depth information associated with a pixel and a z-cache which selectively stores depth information received from a z-buffer in a system memory and depth information received from the depth unit. The z-cache may include a cache memory for storing depth values, a tag array which provides for location of depth values stored in the cache memory and a comparator which compares depth values stored in the cache memory with depth values received from the depth unit. A z-cache control unit which controls accesses to the system memory and the cache memory may also be provided. The rasterizer may also include a frame buffer for storing pixel data to be displayed by a display device, a texture unit for texturing images rasterized by the rasterizer and a frame buffer control unit which controls access to the frame buffer by the rasterizer.

BRIEF DESCRIPTION OF THE DRAWINGS

FIG. 5A is a representation of primitives (triangles) in a frame buffer (color value) and a Z-Buffer (Z-coordinate).

FIG. 5B illustrates an application of the Z-Buffer routine to the primitives of FIG. 5A including overlaying the triangles with respect to their Z-coordinate.

FIGS. 9–15 are timing charts illustrating the functionality of the Z-Cache at different states.

DETAILED DESCRIPTION OF PREFERRED EMBODIMENTS

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
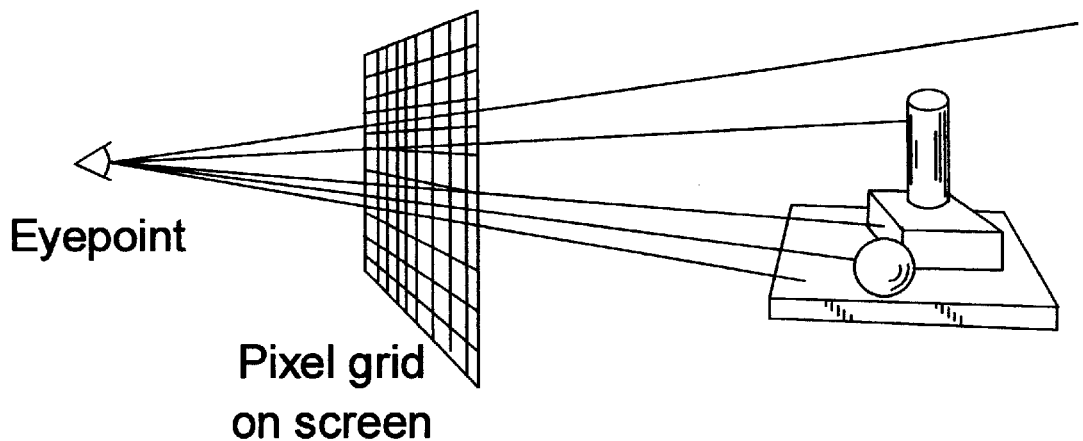
FIG. 1 is a perspective view of a projection of a 3D object onto a pixel-oriented screen.
Figure 2:
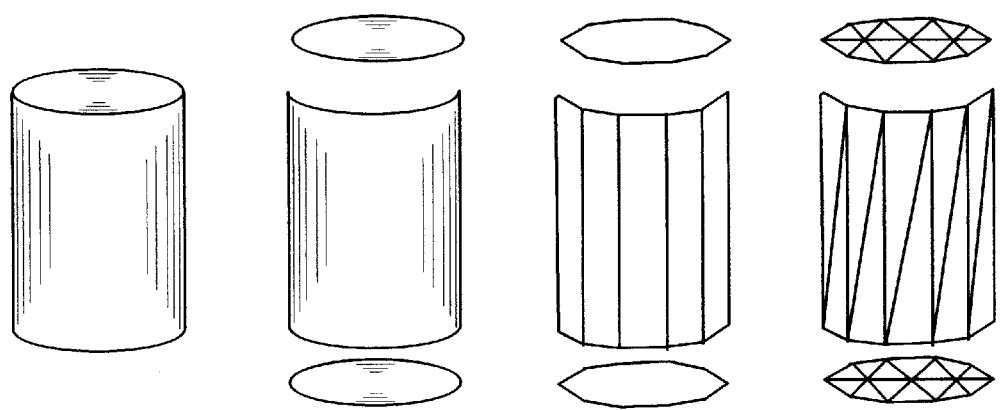
FIG. 2 illustrates the approximation of the surface of a cylindrical object by a number of triangles or primitives.
Figure 3:
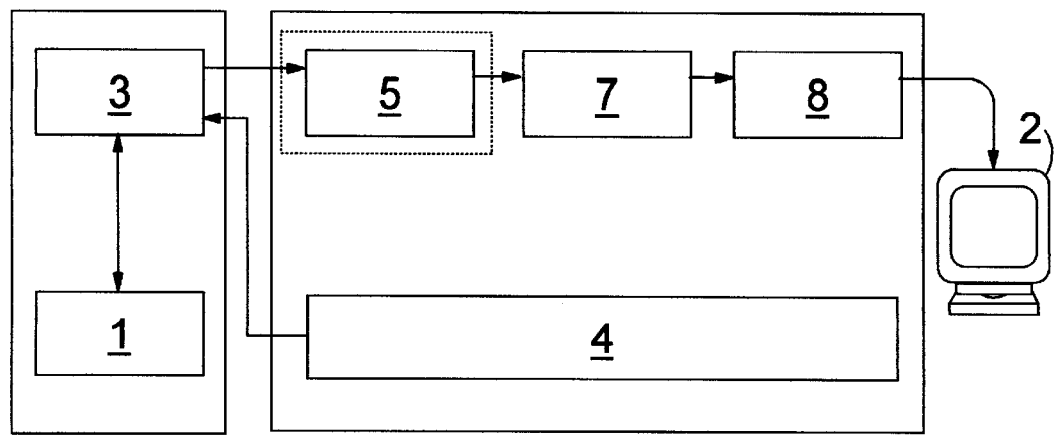
FIG. 3 is a block diagram of conventional 3D graphics hardware.
Figure 4:
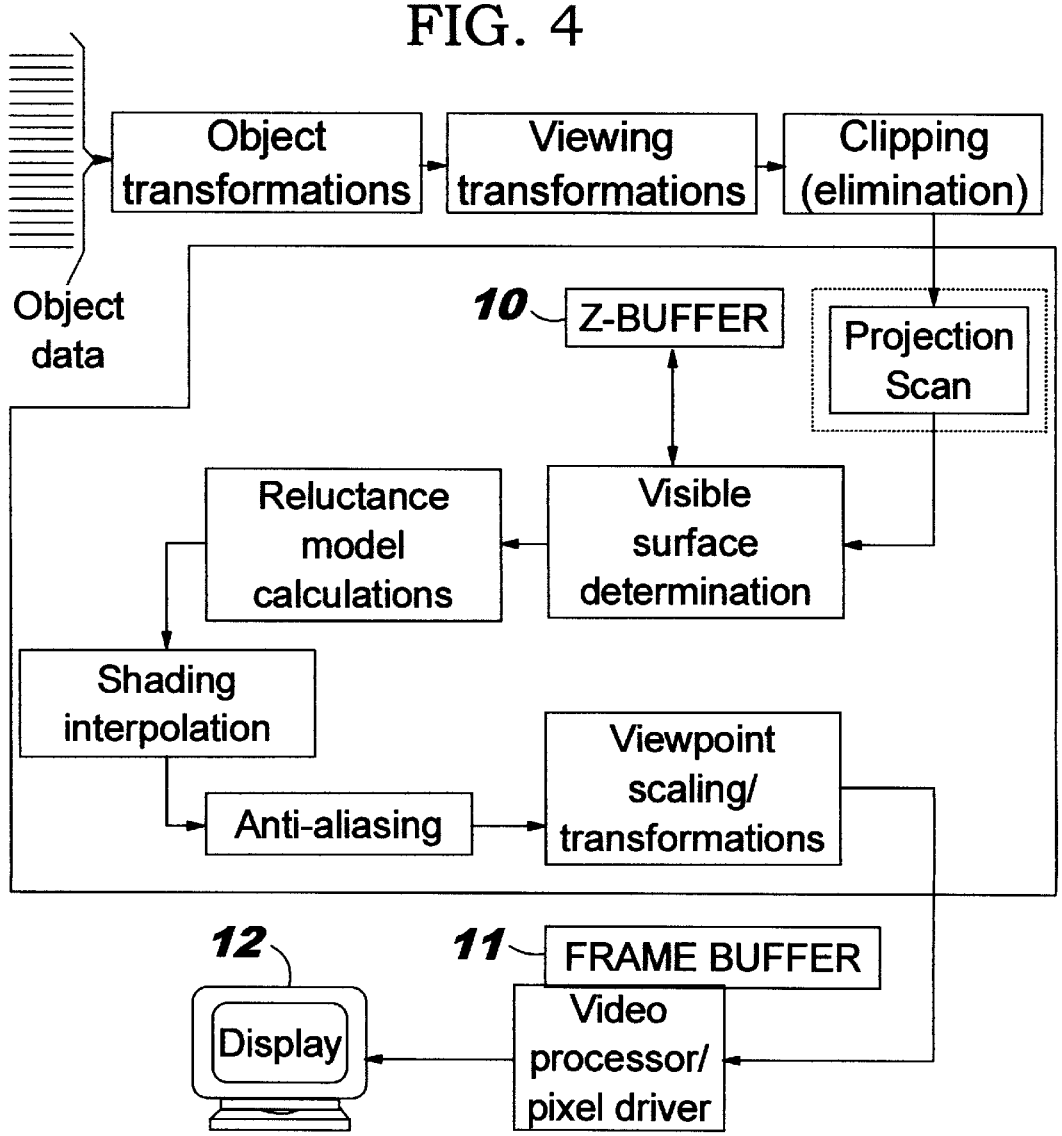
FIG. 4 is a block diagram depicting a conventional 3D graphic display apparatus.
Figure 6:
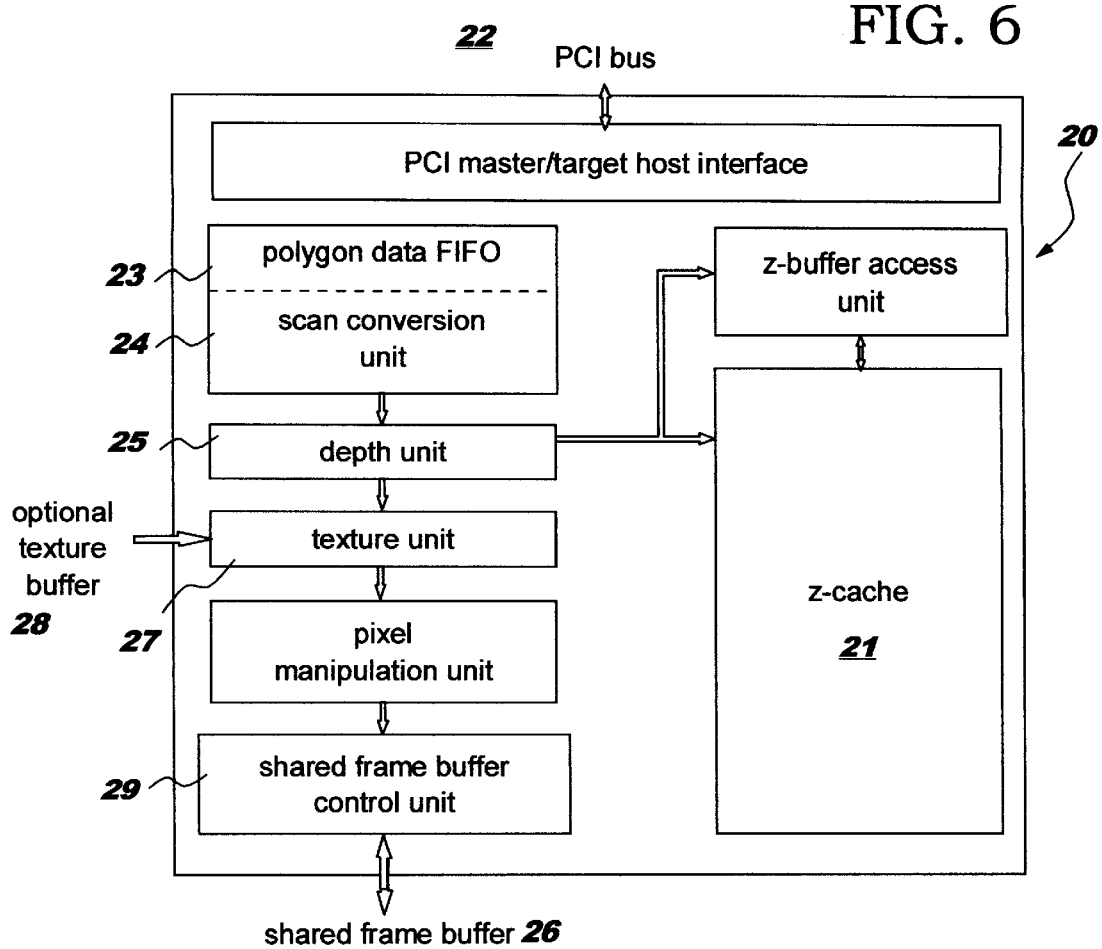
FIG. 6 is a block diagram of a rasterizer unit which comprises a Z-Cache according to an embodiment of the invention.

A Z-Cache, according to an embodiment of the present invention, can be implemented in a rasterizer component of a 3D graphics display system in order to speed up the 3D rendering process in PCI-bus based graphics subsystems. Referring to FIG. 6, a schematic block diagram of a rasterizer 20 having a Z-Cache structure 21 according to an embodiment of the present invention is illustrated. The rasterizer 20 receives triangle data over a PCI-bus 22 from a CPU which is responsible for geometry and setup calculations for the triangles. Data FIFO 23 buffers incoming triangles to provide continuous pixel flow through the rendering pipeline. A scan conversion unit 24 is also provided for scan converting the triangle data into pixel data. A depth unit 25 generates an address for accessing a Z-Buffer (not shown), which may be implemented in system memory, in order to compare the depth value of a current pixel being rendered with the depth value a previously rendered version of the pixel at the same display position in a frame buffer 26.

If the depth value of the pixel in the frame buffer 26 is already stored in the Z-Cache 21, a "cache-hit" occurs when the depth unit 25 requests the pixel depth value from the Z-buffer. In this case, the depth value of the current pixel is compared with the respective depth value stored in the Z-Cache 21. If there is a "cache-miss" on the current pixel position, a copy of the respective line from the Z-Buffer memory is placed into the Z-Cache 21 prior to the comparison. Depending on the comparison result, the depth (Z-) value in the Z-Cache 21 will be replaced by the new Z-value ("z-new") belonging to the pixel currently processed in the rendering pipeline. If the current pixel has been determined as visible by replacing the old Z-value with the new one, the rendering pipeline proceeds with further modifications on the color of the current pixel, by texture mapping or blending. The latter functions can be performed by an optional texture unit 27, which is connected to a respective optional texture buffer 28, and a pixel manipulation unit 29. Finally, the current pixel is written to the frame buffer 26.

In contrast to common CPU cache memories (e.g., L1 cache, L2 cache, and the like), the Z-Cache 21 is not transparent to the execution unit (processor), or the rendering pipeline. In addition to the traditional functions of a cache, such as storing addresses and data, and controlling DMA access to the system memory, the Z-Cache 21 requires that the applied data from the depth unit 25 of the rendering pipeline (z-new) be compared with the existing data (z-old) in the Z-Cache 21. Depending on the comparison, (i.e. determining which pixel is closer to the viewpoint), z-old may be replaced by z-new. Thus the Z-Cache 21 is regarded as a write-only cache which only signals if the write was successful or if the existing z-old value remains in the Z-Cache.

Figure 7:
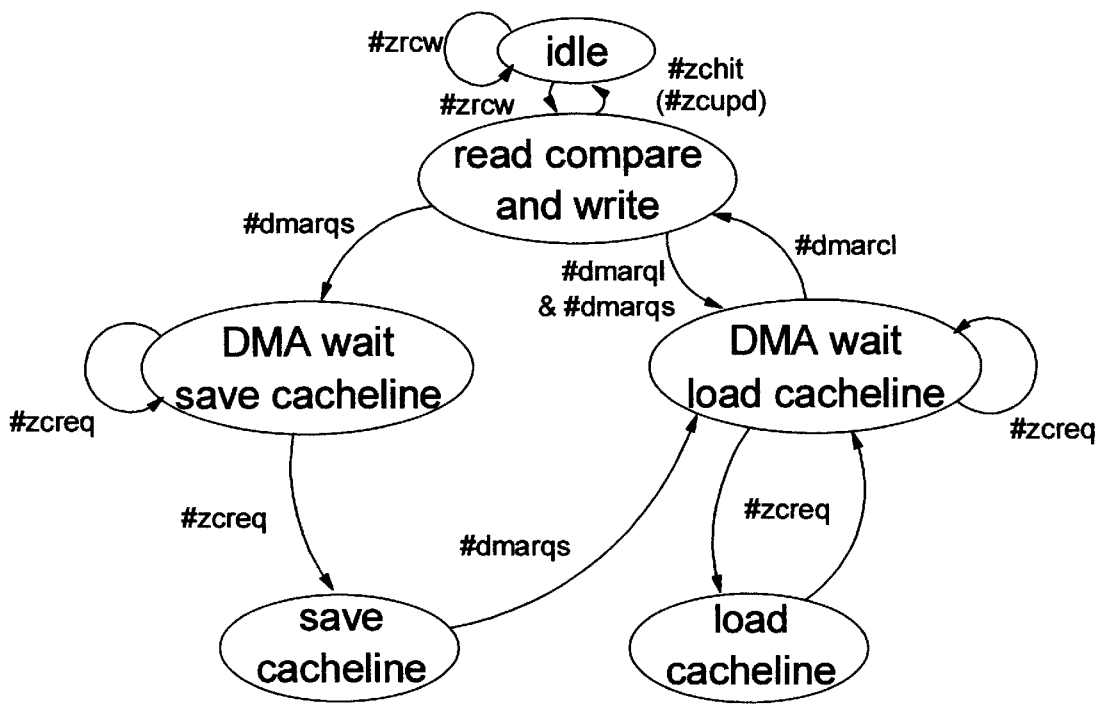
FIG. 7 is a state diagram of the Z-Cache according to an embodiment of the invention.
Figure 8:
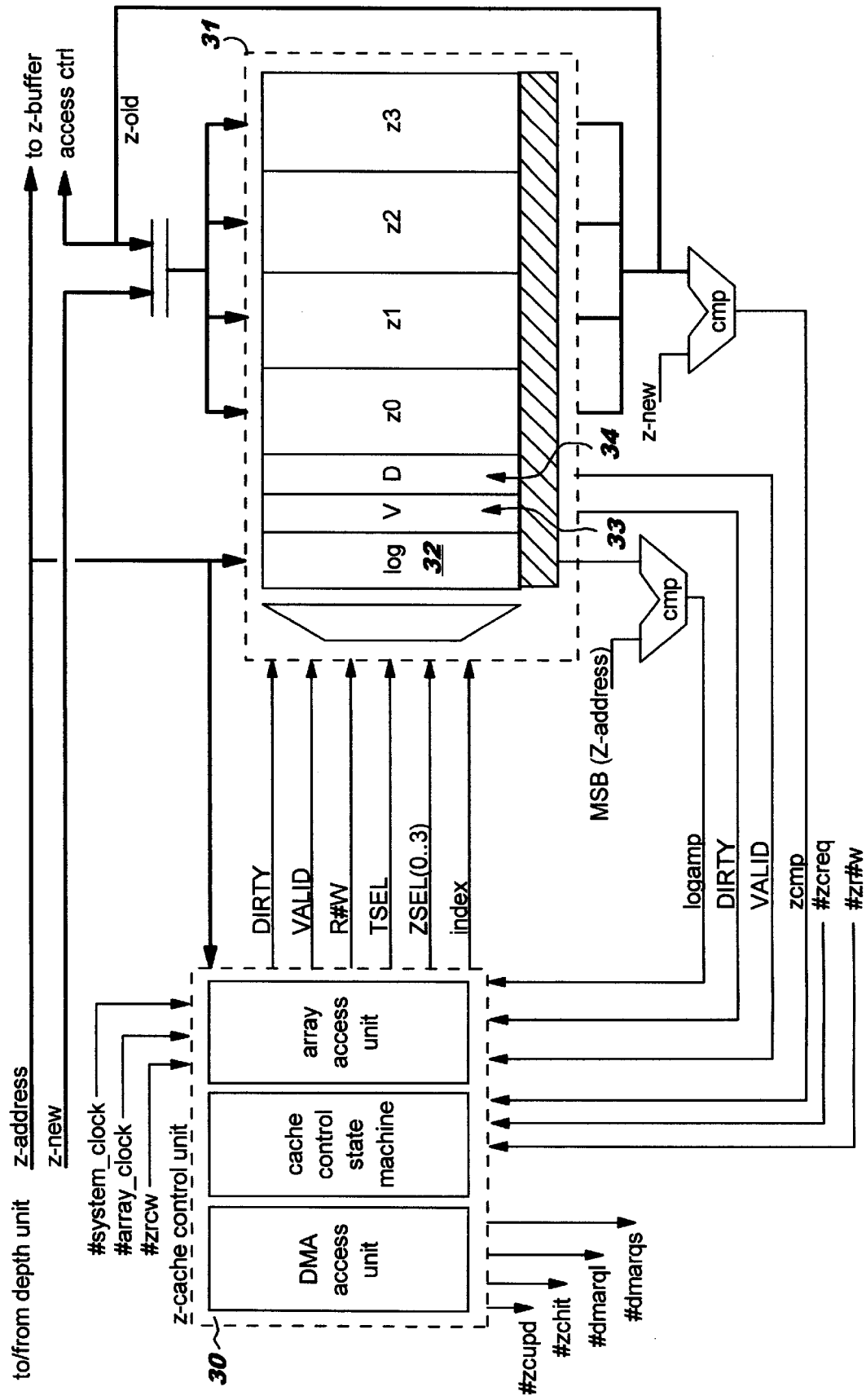
FIG. 8 is a block diagram of an exemplary hardware implementation of the Z-Cache according to an embodiment of the invention.

FIG. 7 illustrates the respective state diagram of the Z-Cache control unit of FIG. 8 in greater detail. As long as there is no request from the depth unit 25 of the rendering pipeline for a z-compare (#zrcw=z-read-compare-write), the Z-Cache remains in an idle state. If a request comes up (#zrcw), the Z-Cache executes a read/compare/write cycle. In case of a cache-hit, the Z-Cache activates a (#zchit =z-cache-hit) z-cache hit signal in the same cycle. In case of z-new<z-old, z-new replaces z-old, which is indicated by a cache update signal (#zcupd=z-cache-update) to the depth unit 25 (FIG. 6).

If the request (#zrcw) results in a cache-miss, a new cache line is loaded from the Z-Buffer in the system memory. A cache-miss can be caused by an invalid cache line which is indicated by a VALID bit, or a tag mismatch with the most significant bits of the address of the current pixel. Depending on the coherency state, which is indicated by a DIRTY bit, the current cache line has to be written back to the Z-Buffer (#dmarqs=dma-request-save) prior to loading a new line (#dmarql=dma-request-load). The Z-Buffer access unit recognizes the DMA request and takes over control of the Z-Cache, while trying to get master access over the PCI-bus. As long as the PCI-bus is not yet granted to the rasterizer, the Z-Cache is in a wait state and the rendering pipeline is stalled. During a burst load by activating "#zcreq" and "#zrcw" low, the Z-Cache compares, on the fly, z-new with the respective incoming z-old in the cache line currently loaded and executes the Z-Buffer routine as described above. By activating "#zchit" and "#zcupd", depending on the Z-Buffer algorithm result, the Z-Cache returns to the idle state.

FIG. 8 presents an overview of an implementation of a Z-Cache according to the present invention. The Z-Cache is divided into two units, a Z-Cache controller unit 30 and a Z-Cache array unit 31. The array unit 31 can store 1024 depth values of 24 bits each, organized in 256 cache lines, (i.e. four depth values per line). The array unit 31 also includes a tag array 32 which stores the most significant bit of the Z-Buffer address, a VALID bit 33 indicating validation of the z-values in that cache line, and a DIRTY bit 34 indicating if the cache line is incoherent with the Z-Buffer (i.e. the rendering unit did update at least one of the depth values in the cache line). The number of bits required for the tag 32 depends on the physical or logical addressing scheme in the Z-Cache. For example, the size of the Z-Cache can be set: for a 1024×768 display resolution, logically addressed, but can also support 1280×1024 display resolution which requires at least 4 Mbyte of addressable depth buffer memory space. Thus the tag entry results in 12 bits.

The Z-Cache controller unit 30 controls the Z-Buffer routine and the respective access to the cache and loading and storing of cache lines by DMA access to the Z-Buffer in the system memory. The timing charts in FIGS. 9–15 give detailed examples of the following Z-Cache accesses. Definitions of the signal lines shown in FIGS. 9–15 are set forth below in Table 1:

TABLE 1

| Z-cache macro interface signals: | |
|---|---|
| #system_clock | clock pulse for the internal rasterizer clock, i.e., clocking the rasterizers pipeline |
| # array_clock | clock pulse to trigger the cache array (derived from the #system_clock), with a fixed phase relation to the #system_clock |
| z-address (I) | address bus carrying the memory address of the z-value (input to the z-cache macro) |
| z-new(i)/z-old (I/O) | data bus carrying the z-value (input: z-new of current pixel, input/output: z-old during load and store operation from/to the eternal z-buffer) |
| #zrcw(I) | control signal to trigger a read-compare-write function within the z-cache macro |
| #zcreq(I) | control signal to trigger the z-cache for load/store from external z-buffer |
| #zr#w(I) | control signal to indicate read or write access to the z-cache during load/store from external z-buffer |
| #zchit(O) | status signal to indicate cache hit to the rasterizer |
| #zcupd(O) | status signal to indicate successful compare of z-new < z-old whereby z-old will be replaced with z-new |
| #DMArqs | status signal indicating a DMA request with store current cache line to the external z-buffer |
| #DMArql | status signal indicating a DMA request with load a new cache line from external z-buffer |
| Some z-cache macro internal signals | |
| #tsel | z-cache internal control signal triggering access to the tag-array |
| #zsel | z-cache internal control signal triggering access to the data array(s) |
| tagr#w | z-cache internal signal triggering read or write access to the tag array |
| tagidx | cache array address, which is the index part of the external z-address |
| tagdin | cache tag data to be written into the tag array, including valid and dirty bit |
| tagdout | cache tag data out from tag array, including valid and dirty bit |
| zintr#w | z-cache internal control signal triggering read or write access to the data array |
| zidx | cache array address, which is the index part of the external z-address |
| zdin | z-value to be written into the data array |
| zdout | z-value read from data array |
| tagcmp | result: cache tag entry compared with tag-part of current z-address (verification of a cache hit) |
| valid | status of the current cache line currently accessed with respect to validation |
| dirty | status of the current cache line currently accessed with respect to data consistency |
| zcmp | result: cache data entry compared with applied z-value (verification of data replacement at current cache data position |

Figure 9:
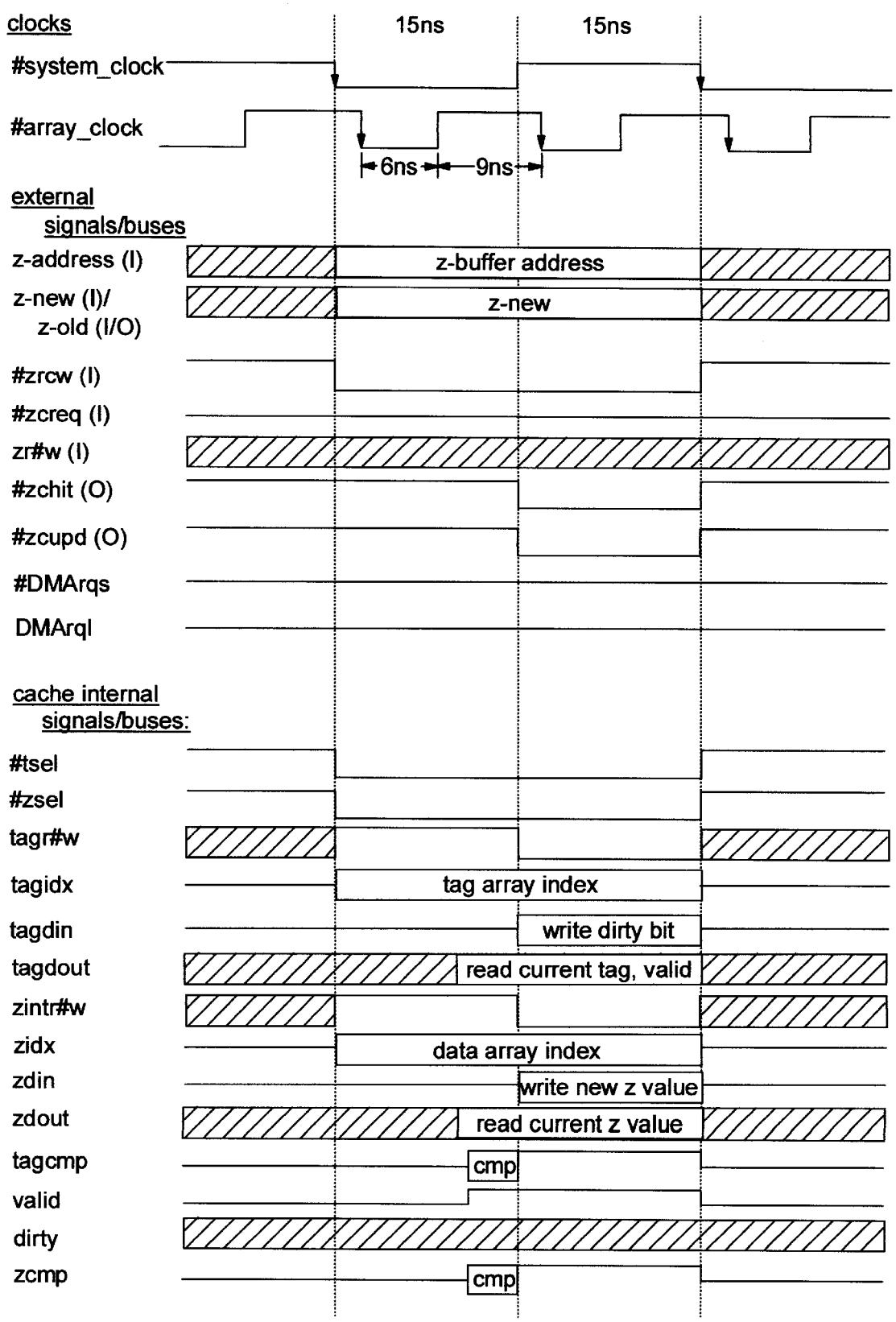

FIG. 9 illustrates a cache hit (indicated by #zchit low), whereby the applied z-value (z-new) replaces the existing z-value (z-old) in the accessed cache line (indicated by #zcupd low). In the first half of the #system-clock, the cache index is applied (derived from z-address) and the tag-entry, valid bit, dirty bit and the cache line entry are read. Also, the valid bit is checked (valid high, the tag is compared with the applied address (match:tagcmp high)), z-old is selected from the cache line and compared with the applied z-new (z-new<z-old; zcmp high). In the second half of the #system clock, the dirty bit in the tag-entry and z-new are written to the current cache line.

Figure 10:
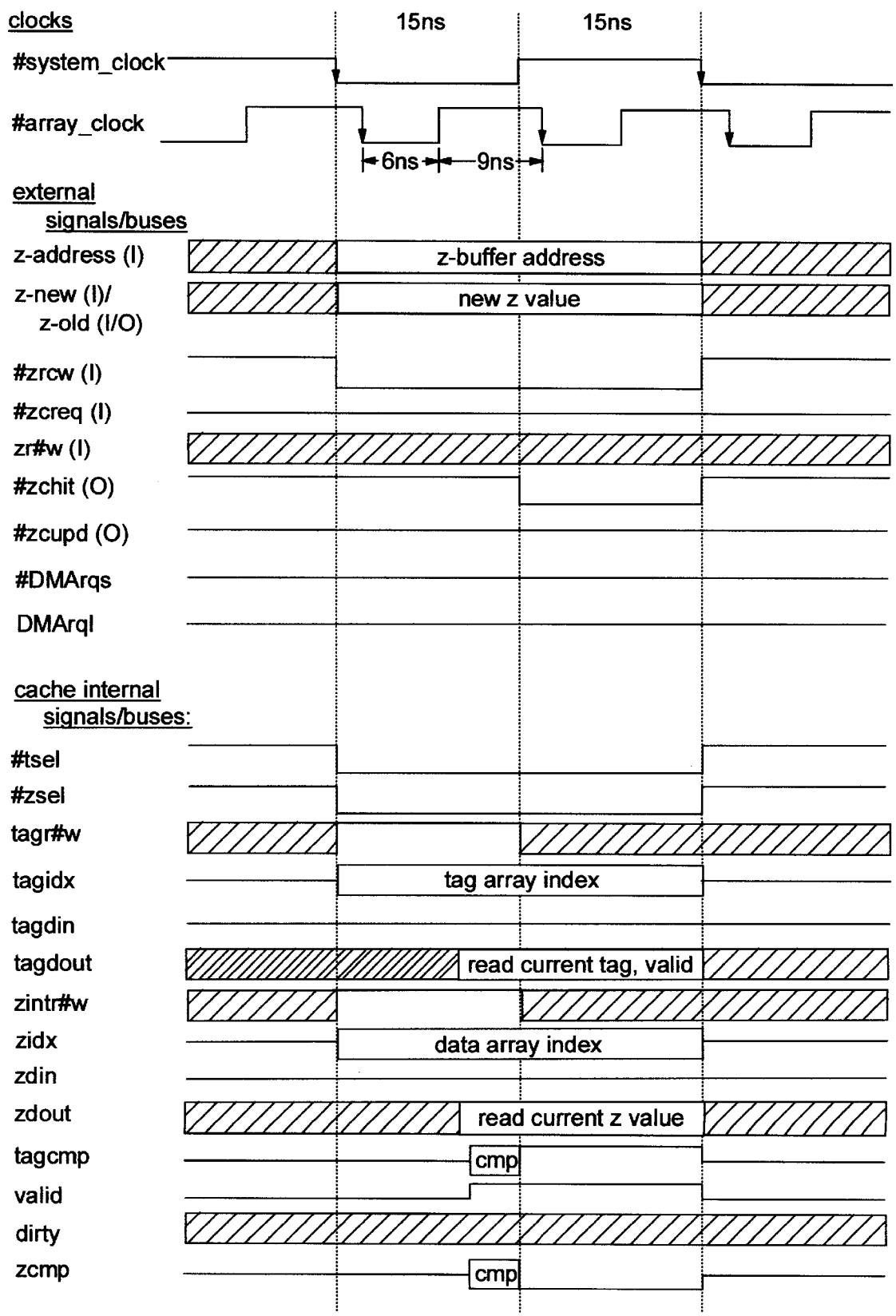
Figure 11:
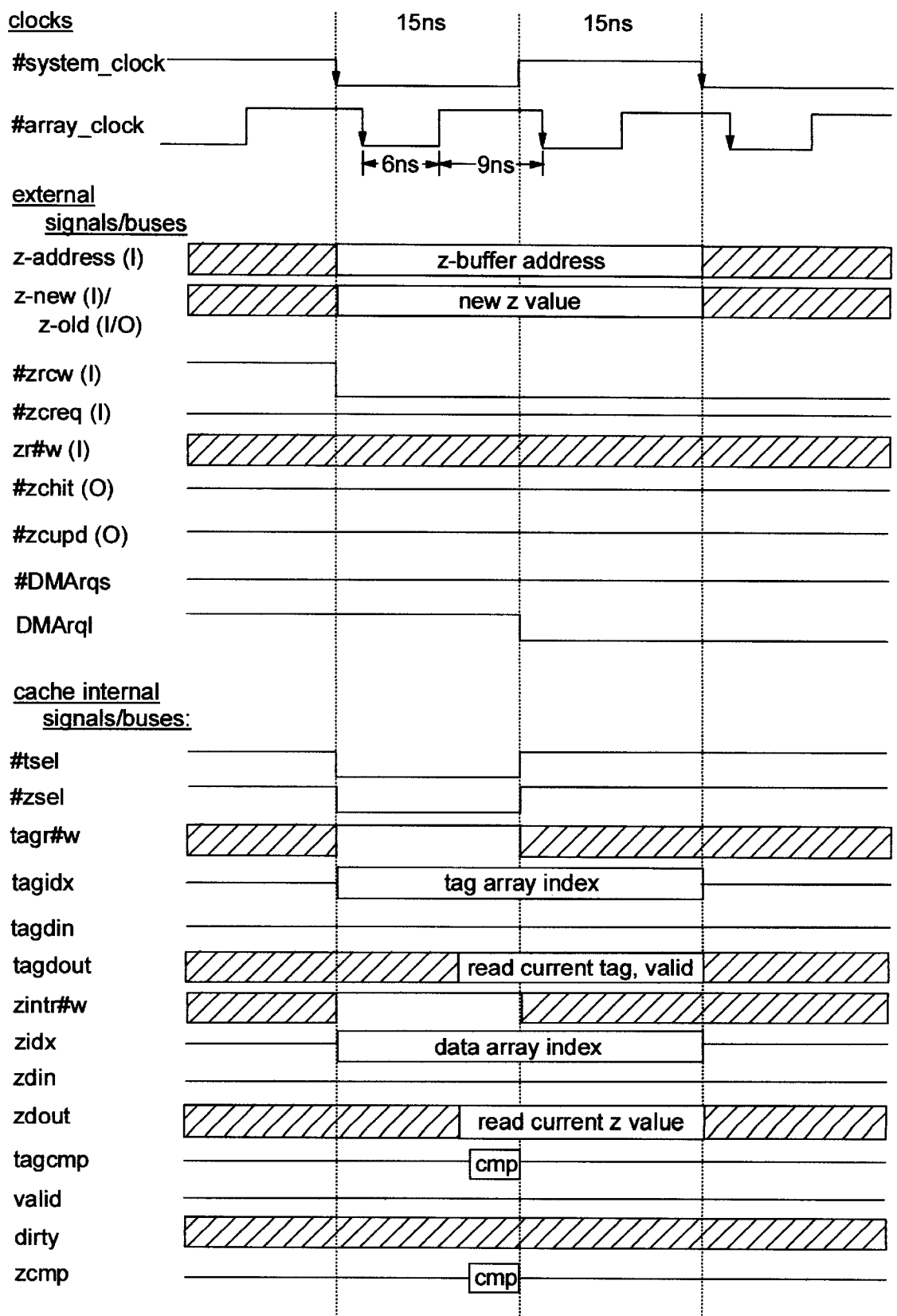

FIG. 10 illustrates a cache hit, but the cache line will not be updated with z-new (#zcupd remains high), because z-new is greater or equal to the existing z-old stored in cache (#zcupd remains high). FIG. 11 illustrates a cache line miss, because the current cache line entry is invalid (valid remains low after reading out the tag entry). Thus, the rasterizer loads a new cache line from the external z-buffer (indicated by #DMArql going low). The z-cache module is in idle state until a new cache line is available and the applied z-new can be compared with z-old loaded from the external z-buffer (see FIG. 14).

Figure 12:
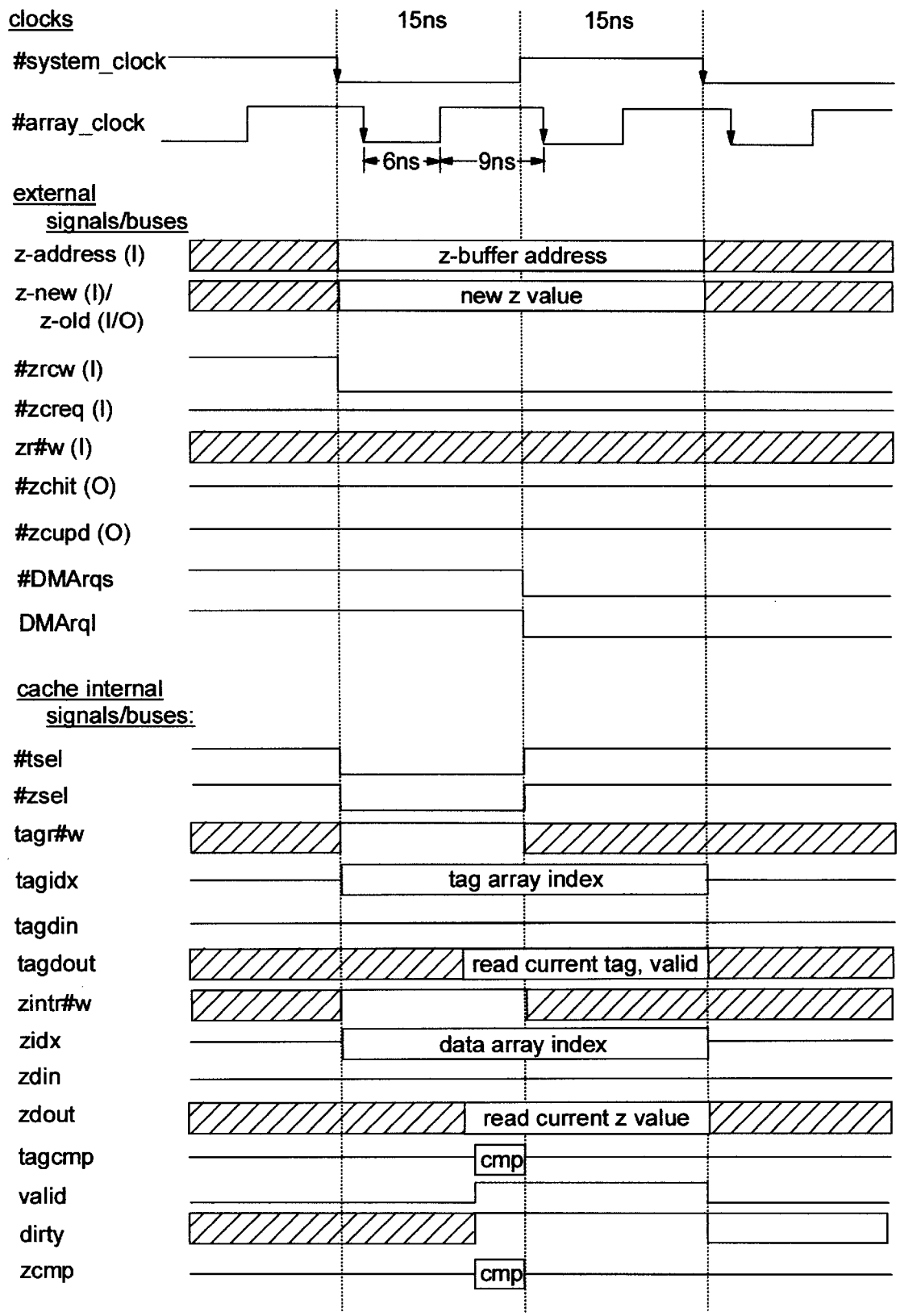

FIG. 12 illustrates a cache line miss with a valid line entry (valid high), but mismatch of tag entry with the applied address of z-new (tagcmp low). Because the cache line is inconsistent with the external z-buffer memory (dirty high), the current line has to be written back to the z-buffer (#DMArqs low), before a new cache line is loaded from the external z-buffer (#DMArql low).

Figure 13:
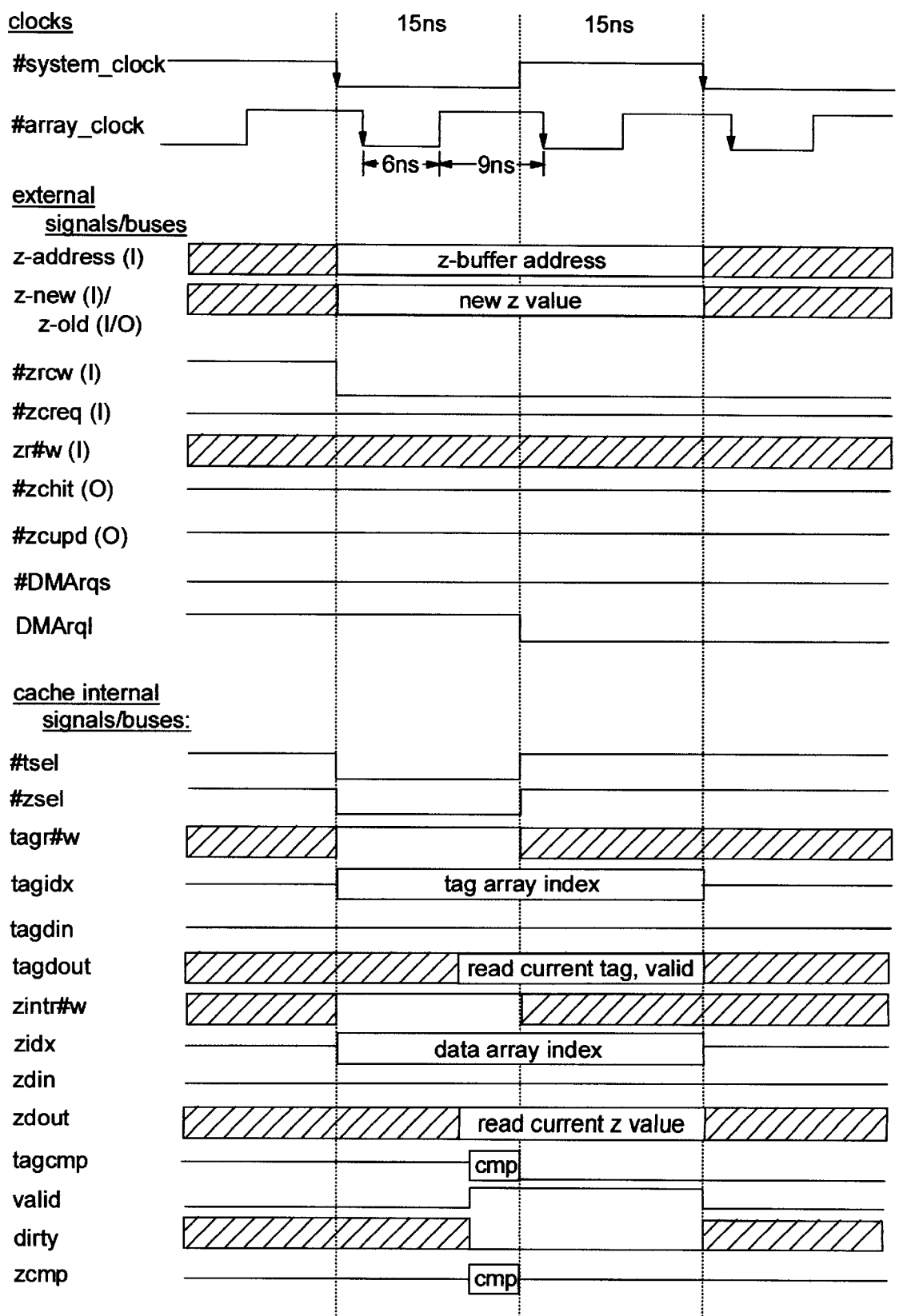

FIG. 13 differs from FIG. 12 in that the cache is consistent with the z-buffer (dirty low), and the cache miss situation does not require storage of the current cache line (#DMArqs high) before reading a new line from z-buffer (#DMArqul low). FIG. 14 illustrates a burst read access to the external z-buffer in the case of a cache miss. In FIG. 14, #zcreq low indicates to the z-cache to read burst data from the external z-buffer. The cache line will be written to the z-cache (zr#w low), whereby z-new will be compared with z-old "on the fly". Depending on the comparison results, z-new or z-old will be written to the cache and the dirty bit will or will not be set. In FIG. 14, z-new is less than z-old, therefore z-new instead of z-old is written to the cache (#zcupd low). Operation of the rasterizer proceeds after indication of the 'pseudo' cache hit (#zchit low). #DMArql indicates the end of the burst read from z-buffer.

FIG. 15 illustrates a burst write back to the external z-buffer in case of inconsistency of a cache line with the z-buffer entry (dirty high), if the current cache-line has to be replaced with a new line. The last cycle of the store operation resets the valid bit of the tag entry in order to invalidate the cache line. #DMArqs going high indicates the end of the store operation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of visible surface determination in a graphics display system for mapping 3D-graphics information onto a 2D-representation space, the method comprising the steps of:

storing in a depth buffer in system memory first depth values associated with pixels in a display so as to map a pseudo z-buffer into system memory such that the system memory may be utilized by other applications executing on the data processing system if a 3D graphics application is not executing on the data processing system;

storing in a depth cache a first depth value from the depth buffer associated with a specific pixel;

determining a second depth value for the specific pixel;

comparing the second depth value of the specific pixel with the first depth value associated with the specific pixel and stored in the depth cache to provide a depth comparison result by performing a one cycle read/compare/write operation; and selectively replacing the first depth value stored in the depth cache with the second depth value based upon the depth comparison result that was obtained by performing said one cycle read/compare/write operation.

2. A method according to claim 1, wherein said step of storing in a depth cache is preceded by the step of obtaining the first depth value corresponding to the specified pixel from the depth buffer.

3. A method according to claim 2, wherein said step of selectively replacing is followed by the step of storing the second depth value in the depth buffer resident in system memory of said step of selectively replacing replaces the first depth value with the second depth value.

4. A graphics processing system comprising:

a central processing system;

a rasterizer which rasterizes three-dimensional image data received from said central processing system;

system memory operably associated with the central processing system and said rasterizer a portion of which provides a pseudo z-buffer in system memory such that the system memory may be utilized by other applications executing on the central processing system if a 3D graphics application is not executing on the central processing system; and wherein said rasterizer includes:

a depth unit for determining depth information associated with a pixel;

a z-cache which selectively stores depth information received from said z-buffer in said system memory and depth information received from said depth unit; and a comparator which compares depth values stored in said z-cache with depth values received from said depth unit by performing a one cycle read/compare/write operation wherein a depth value from the z-cache is read, compared and written in one clock cycle.

5. A graphics system according to claim 9, wherein said z-cache comprises:

a tag array which provides for location of depth values stored in said cache memory; and a z-cache control unit which controls accesses to said system memory and said cache memory.

6. A graphic system according to claim 4, further comprising a frame buffer for storing pixel data to be displayed by a display device.

7. A graphics system according to claim 6, wherein said rasterizer further comprises:

a texture unit for texturing images rasterized by said rasterizer; and a frame buffer control unit which controls access to the frame buffer by the rasterizer.

8. A data processing system for visible surface determination in a graphics display system for mapping 3D-graphics information onto a 2D-presentation space, where depth information is provided via a depth buffer routine, said data processing system comprising:

means for storing attribute information for each of said graphical elements;

means for storing depth information for each of said graphical elements in a system memory, so as to map a pseudo z-buffer into system memory such that the system memory may be utilized by other applications executing on the data processing system if a 3D graphics application is not executing on the data processing system;

depth cache means for storing recently used depth information and for performing said depth buffer routine; and means for performing a one cycle read/compare/write operation wherein a depth value from the depth cache means is read, compared and written in one clock cycle.

9. A system according to claim 8, wherein said depth cache means comprises a write-only cache memory that signals if a write operation is successful and if previously stored depth information remains in said depth cache means.

10. A system according to claim 8, wherein said depth cache means comprises a burst read and write cache memory.

11. A system according to claim 8, wherein said depth cache means comprises:

control means for controlling said depth buffer routine and for controlling loading and storing of depth information in said depth cache means; and array means for storing actual graphical element information.

12. A system according to claim 11, wherein said array means comprises:

tag array means for storing address bits of said depth information storing means;

first indicator means for indicating validation of depth values in a respective depth cache memory line; and second indicator means for indicating whether a depth cache memory line is incoherent with a respective line stored in said depth information storing means.

* * * * *

UNITED STATES PATENT AND TRADEMARK OFFICE
CERTIFICATE OF CORRECTION

PATENT NO.    : 6,222,552 B1
DATED         : April 24, 2001
INVENTOR(S)   : Haas et al.

It is certified that error appears in the above-identified patent and that said Letters Patent is hereby corrected as shown below:

Title page,
Item [56], FOREIGN PATENT DOCUMENTS, third-listed document should appear as:
-- 87-042279    2/1987   (JP)         G06F/15/72 --

Column 12,
Line 55, should appear as follows:
-- 5. A graphics system according to claim 4, wherein said --

Signed and Sealed this

Sixth Day of August, 2002

Attest:

Attesting Officer

JAMES E. ROGAN
*Director of the United States Patent and Trademark Office*